Patented Nov. 13, 1951

2,575,061

UNITED STATES PATENT OFFICE 2,575,061

COMPOUNDING FINELY DIVIDED SOLIDS WITH BUTADIENE-STYRENE SYNTHETIC RUBBER LATICES UTILIZING ALKALINE LIGNIN SOLUTIONS AS DISPERSING AGENTS

William McMahon, Summit, N. J., assignor to Bell Telephone Laboratories, Incorporated, New York, N. Y., a corporation of New York No Drawing. Application September 11, 1945, Serial No. 615,688

10 Claims. (Cl. 260—17.5)

This invention relates to methods of reinforcing synthetic elastomer compositions by the addition of finely divided solid fillers. More particularly it relates to methods of incorporating finely divided reinforcing fillers, and particularly finely divided solid lignin, in synthetic elastomers by forming a suspension of these fillers in synthetic elastomer latices, using alkali solutions of lignin as dispersing agents.

In alkaline wood pulping processes for paper manufacture, particularly the soda process and the kraft sulphate process, large quantities of spent liquor are produced from which a lignin substance is precipitated by acidification of the liquor, as by bubbling gaseous carbon dioxide therethrough. The lignin so precipitated is sold commercially as a water insoluble finely divided solid. This lignin may be dissolved in aqueous alkali solutions such as caustic soda or potash solutions.

In the compounding of butadiene-styrene elastomers, it has been found that superior properties are obtained if the reinforcing solid filler is incorporated by suspending the finely divided filler in the elastomer latex, by means of a dispersing agent, prior to coagulation of the latex instead of by milling the filler into the previously coagulated latex. Such a compounding method is more particularly described and claimed in the copending application of William McMahon, Serial No. 517,239, filed January 6, 1944, and now abandoned.

The present invention is concerned with the discovery that an aqueous alkali solution of the relatively cheap lignin, particularly that derived from an alkaline wood pulping process as described above, serves as a very effective dispersing agent for the latex compound of butadiene-styrene elastomers in place of the more expensive dispersing agents commonly used. The process of the present invention provides a cheap and effective means of incorporating any of the common reinforcing fillers such as carbon blacks, zinc oxides, clays, magnesium oxides, calcium silicates and other common finely divided reinforcing fillers. This process is particularly advantageous when finely divided lignin is employed as the reinforcing filler in place of the more expensive reinforcing fillers commonly used.

The process of the present invention is applicable to the compounding of any butadiene-styrene copolymer which is a synthetic rubber or elastomer in its physical properties. This includes copolymers formed from butadiene-styrene mixtures containing between about 50 mol per cent and about 90 mol per cent of butadiene. The most common butadiene-styrene elastomers are formed from butadiene-styrene mixtures containing about three parts of butadiene to one part of styrene. The butadiene entering into the common butadiene-styrene copolymer synthetic rubbers is butadiene 1,3.

Although in carrying out the process of the present invention the alkali lignin dispersing agent may be added directly to the latex and the reinforcing filler may then be dispersed directly in the latex, the process can be carried out more conveniently by dispersing the filler in a separate aqueous solution of the alkali lignin and then subsequently mixing this suspension with the latex. When finely divided lignin is used as the filler, it may be suspended in a previously formed solution of alkali lignin dispersing agent or the lignin may be added to an aqueous solution of an alkali hydroxide containing only sufficient alkali to dissolve sufficient lignin to form the required amount of dispersing agent, the remaining lignin being retained in its original solid form. Although the process may also be carried out with the reinforcing lignin completely dissolved in an alkaline solution, such a procedure requires the use of an undesirably large amount of alkali.

The latex containing dissolved lignin and suspended reinforcing filler is then coagulated as by the addition of a suitable acid such as dilute sulphuric acid. Coagulation of the latex by acidification causes the simultaneous precipitation of elastomer, filler and dissolved lignin. The amount of lignin which is thus precipitated acts as an additional reinforcing filler. The coagulum is preferably dried in the form of crumb as precipitated. Any suitable drying temperature which is not so high as to deteriorate the elastomer may be used.

The dried crumb is then compounded by conventional rubber mixing technique as, for instance, by milling with sulphur, accelerator, antioxidant and other common compounding materials. The compound may then be molded in the desired form or it may be continuously extruded and vulcanized in the conventional manner to form elongated articles such as rubber tubing and rubber insulated wire.

If desired, other compounding ingredients such as anti-oxidants and plasticizers may be dispersed in the latex, prior to coagulation, along with the reinforcing filler. However, it is ordinarily more desirable to add these ingredients by the conventional rubber mixing technique along with the vulcanizing agent and accelerator. It is ordinarily not desirable to add the vulcanizing agent to the uncoagulated latex since the presence of a vulcanizing agent in the coagulum may cause a certain amount of precuring during the drying operation. The mechanical working of such a precured elastomer, such as is involved in subsequent mixing or molding, causes substantial loss of tensile strength and substantial deterioration of other physical properties.

However, in certain instances where no further molding, mixing, or other mechanical distortion of the mixture derived from the latex is necessary, as in the formation of thin elastomer films or coatings on the surfaces of various objects, the vulcanizing agent along with all the other compounding ingredients may be suspended in the latex and the entire mixture may be either dried or coagulated in the form of a thin film and, after drying, may be heated to a vulcanizing temperature.

Any proportion of filler commonly employed in the compounding of butadiene-styrene elastomers may be employed in the process of the present invention such as filler loadings of between about 20 per cent by weight and about 300 per cent by weight or more of the elastomer. The proportion of filler desired in the final compound may be incorporated by the process of the present invention or a master batch containing a larger amount of filler than is required in the final compound may be prepared and this master batch may subsequently be milled with unfilled elastomer gum.

The following specific examples will illustrate the manner in which the present invention may be practiced:

Example 1

A quantity of Lignin KSA (a commercial lignin prepared by acid precipitation from the spent liquor of the kraft sulphate process of wood pulping) was dissolved in an aqueous solution of sodium hydroxide. A portion of this solution containing about 16 grams of Lignin KSA in solution was added to several liters of water and 800 grams of Kosmobile #77 (carbon black) were dispersed therein by stirring it until the carbon black was completely wetted and then passing the mixture through a colloid mill. The resulting dispersion was added to a butadiene-styrene elastomer latex containing 1,600 grams of the elastomer. The mixture was then coagulated in the usual manner with sulphuric acid. The coagulum was washed and dried and then milled with additional ingredients to produce a compound having the following composition:

| | Parts by weight |
|---|---|
| Elastomer | 100 |
| Kosmobile #77 | 50 |
| Lignin | 1 |
| Zinc oxide | 5 |
| BRT #7 (coal tar plasticizer) | 4.5 |
| Sulphur | 2 |
| Thionex (tetramethyl thiuryl monosulfide) | .25 |
| 808 Accelerator (butyraldehyde-aniline) | .50 |

The BRT #7 used in this composition is a common rubber plasticizer which consists of refined coal tar and is a heavy viscous liquid having a specific gravity between 1.20 and 1.25 at 25 degrees C. having an Engler viscosity of 120 to 200 seconds for 100 cc. at 100 C. and having a 0% distillation at 270° C. and a maximum distillation of 25% at 300° C. Test sheets of this compound, which were cured at 298° F., had the following properties:

| Time of Cure (minutes) | Modulus at 300 per cent Elongation (Pounds per square inch) | Tensile Strength (Pounds per square inch) | Per cent Elongation at Break |
|---|---|---|---|
| 20 | 1,600 | 2,465 | 405 |
| 30 | 1,520 | 3,390 | 510 |
| 40 | 1,490 | 3,360 | 525 |
| 50 | 1,445 | 3,575 | 545 |
| 75 | 1,415 | 3,510 | 540 |

Example 2

150 grams of Lignin KSA was dispersed in 1,500 cubic centimeters of water with the aid of 30 grams of a 25 per cent solution of Lignin KSA in caustic soda (7.5 grams of lignin). The mixture was processed in a ball mill for about 90 minutes. It was then added to a butadiene-styrene elastomer latex containing 500 grams of the elastomer. After thorough mixing, the resulting suspension was coagulated with sulfuric acid. The coagulum was filtered and washed until free of acid and was then dried, milled with sulphur, accelerator, antioxidant and plasticizer and cured. The cured product possessed good mechanical properties.

Although the invention has been described in terms of its specific embodiments, certain modifications and equivalents will be apparent to those skilled in the art and are intended to be included within the scope of the present invention which is to be limited only by the reasonable scope of the appended claims.

What is claimed is:

1. The method which comprises suspending a finely divided solid in an aqueous alkaline solution of lignin, mixing the dispersion with a latex of a butadiene-1,3-styrene copolymer synthetic rubber and coagulating the latex together with the suspended solid and dissolved lignin.

2. The method which comprises forming a suspension of a finely divided solid in a butadiene-1,3-styrene copolymer synthetic rubber latex, using an aqueous alkali metal hydroxide solution of lignin as a dispersing agent and coagulating the latex together with the suspended solid and dissolved lignin.

3. The method which comprises suspending carbon black in an aqueous sodium hydroxide solution of lignin, mixing the suspension with a latex of a butadiene-1,3-styrene copolymer synthetic rubber and acidifying the latex to cause coagulation of the suspended synthetic rubber, carbon black and dissolved lignin.

4. The method which comprises forming a suspension of finely divided undissolved lignin in an aqueous sodium hydroxide solution, mixing the suspension with a latex of a butadiene-1,3-styrene copolymer synthetic rubber and acidifying the latex to cause coagulation of the suspended synthetic rubber together with dissolved and suspended lignin.

5. The method described in claim 2 wherein the coagulated mixture is subsequently intimately mixed with a vulcanizing agent and cured.

6. The method described in claim 3 wherein the coagulated mixture is subsequently intimately mixed with a vulcanizing agent and cured.

7. The method described in claim 4 wherein the coagulated mixture is subsequently intimately mixed with a vulcanizing agent and cured.

8. The method which comprises forming a suspension of a finely divided solid in a butadiene 1,3-styrene copolymer synthetic rubber latex, using an aqueous alkaline solution of lignin as a dispersing agent and coagulating the latex together with the suspended solid and dissolved lignin.

9. The method which comprises forming a suspension of carbon black in an aqueous alkaline solution of lignin, mixing the suspension with a butadiene 1,3-styrene copolymer synthetic rubber latex and coagulating the latex together with the suspended carbon black and dissolved lignin.

10. The method which comprises suspending zinc oxide in an aqueous sodium hydroxide solution of lignin, mixing the suspension with a latex of butadiene-1,3-styrene copolymer synthetic rubber and acidifying the latex to cause coagulation of the suspended rubber, zinc oxide and dissolved lignin.

WILLIAM McMAHON.

REFERENCES CITED

The following references are of record in the file of this patent:

UNITED STATES PATENTS

| Number | Name | Date |
|---|---|---|
| 1,898,522 | Bock | Feb. 21, 1933 |